United States Patent
Rosen et al.

(10) Patent No.: US 6,256,069 B1
(45) Date of Patent: Jul. 3, 2001

(54) GENERATION OF PROGRESSIVE VIDEO FROM INTERLACED VIDEO

(75) Inventors: Andrew D. Rosen, Woodinville; William J. Heaton; John A. Painter, both of Everett; Philip G. Zack, SeaTac, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/167,288

(22) Filed: Oct. 6, 1998

(51) Int. Cl.[7] .................................................. H04N 7/01
(52) U.S. Cl. .................. 348/448; 348/441; 348/449; 348/458; 348/561; 348/704; 345/127; 345/129
(58) Field of Search ........................ 348/441, 448, 348/449, 458, 561, 704; 345/127, 129; H04N 7/01

(56) References Cited

U.S. PATENT DOCUMENTS

| | | | |
|---|---|---|---|
| 5,132,793 | * 7/1992 | Hirahata et al. | 348/448 |
| 5,444,494 | * 8/1995 | Yamamoto et al. | 348/448 |
| 5,473,381 | * 12/1995 | Lee | 348/441 |
| 5,534,935 | * 7/1996 | Kawai et al. | 348/448 |
| 5,999,220 | * 12/1999 | Washino | 348/441 |

FOREIGN PATENT DOCUMENTS 10-98694  *  4/1998  (JP) .

* cited by examiner

*Primary Examiner*—Reinhard J. Eisenzopf
*Assistant Examiner*—Brian P. Yenke
(74) *Attorney, Agent, or Firm*—Workman, Nydegger & Seeley (57) ABSTRACT

The generation of progressive output video from interlaced source video is disclosed. In one aspect of the invention, a computerized system includes an interlaced source video and a progressive output video. The interlaced source video has a number of lines and includes a first field having odd lines and a second field haveing even lines. The progressive output video has a number of lines half that of the number of lines of the interlaced source video. Each line of the progressive output video heavily weight weights a corresponding line of each of the first field and the second field of the interlaced source video. Desirably, each line of the progressive output video also lightly weights an immediately successive and an immediately preceding line of each of the first field and the second field of the interlaced video source.

25 Claims, 5 Drawing Sheets

GENERATION OF PROGRESSIVE VIDEO FROM INTERLACED VIDEO

FIELD OF THE INVENTION

This invention relates generally to progressive video, and more particularly to such video that is generated from interlaced video.

BACKGROUND OF THE INVENTION

The viewing of multimedia on personal computers, such as personal computers running a version of the Microsoft Windows operating system, has become very commonplace. Such multimedia content is frequently derived from television-type video sources. That is, a videotape from a television program or similar content may be viewed in real-time on a computer.

Processing television images for display by a computer is a complex and intensive task, however, because of the nature of television images themselves as compared to the nature of images typically displayed by computers. A television image is usually an interlaced video image. This means that each image consists of two separate fields, one field including the odd scan lines of the image, and the other field including the even scan lines of the image. Displaying each field in rapid order creates the illusion of one image. In this manner, even though the transmission of video information may be limited to a given number of scan lines, the resolution of the video information actually displayed is doubled.

Figure 1:
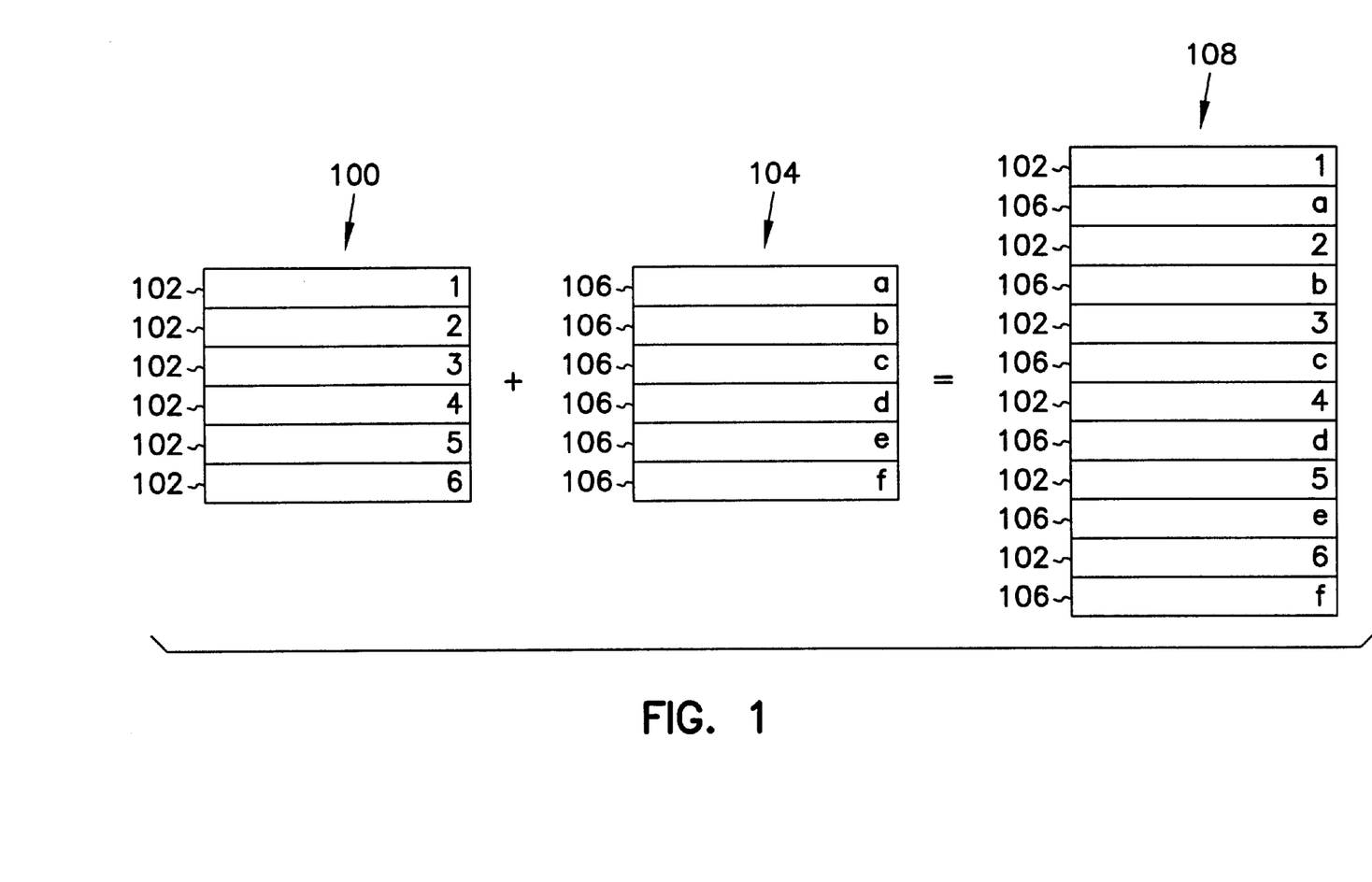
FIG. 1 shows a diagram of an interlaced source video.

This is illustrated by reference to FIG. 1. Field 100 includes lines 102. Each of lines 102 corresponds to an odd line of an image. Field 104 includes lines 106, each of which corresponds to an even line of an image. Thus, displaying fields 100 and 104 in rapid succession in an appropriate manner results in interlaced image 108, where lines 102 are the odd lines of the image, and lines 106 are the even lines of the image. Interlaced video is known in the art, and is used in such application as television programming, etc.

Computers, however, usually do not use interlaced video, but rather progressive video. Rather than displaying two fields of scan lines—one field for even lines, and one field for odd lines—in rapid succession to create the illusion of a single image, progressive video displays only one field of scan lines—including both even and odd scan lines—which is the image itself. Technically, this is a less complex manner by which to display images. However, it is generally incompatible with source video that is interlaced. Progressive video is also known in the art.

There are a number of solutions within the prior art to convert interlaced video to progressive video, so that it can be displayed by a computer. A technically simple solution, but undesirable from a display standpoint, is to merely use only one of the two fields present in the interlaced source video as the only field of the progressive output video. Thus, only the odd or even scan lines of the interlaced source video are shown in the progressive output video actually displayed. This results in a jagged look to the display of the progressive video, and may result in blank scan lines where the non-displayed even or odd lines carried vertical detail information. However, this solution is technically easy to accomplish, because minimal processing is taking place: both fields of the interlaced video are input, but only one field is actually displayed.

A more sophisticated approach to convert interlaced video to progressive video is to perform line doubling on one of the fields of the interlaced video, and then combine the resulting image with a line doubled version of the other field of the interlaced video. This "de-interlaced" image can then be displayed in a progressive manner at the frame rate instead of at the field rate. However, this solution requires that the second field be precisely positioned over the first field when it is being combined with the first field. The lines of the second field that were derived in the doubling process must be aligned with the source lines of the first field. The lines of the first field that were derived in the doubling process must be aligned with the source lines of the second field. If precise positioning is not accomplished, a jitter or shaking effect will be seen in fine detail areas on the resulting displayed progressive video. This line doubling and combination solution is also less than desirable because it requires significant processing to achieve. For example, the typical personal computer does not have sufficient processing power to perform line doubling and combination.

Therefore, there is a need for a manner by which to generate progressive output video from interlaced source video that results in a high-quality image when the output video is displayed by a computer. Such a solution should not require processing that cannot be accomplished by the typical personal computer. Thus, the solution should provide high-quality images in accordance with a relatively straightforward algorithm.

SUMMARY OF THE INVENTION

The above-mentioned shortcomings, disadvantages and problems are addressed by the present invention, which will be understood by reading and studying the following specification. One aspect of the invention is a computerized system having an interlaced source video and a progressive output video. The interlaced source video has a number of lines and includes a first field having odd lines and a second field having even lines. The progressive output video has a number of lines half that of the number of lines of the interlaced source video. This eliminates the precise positioning requirement found in solutions that use line doubling. Each line of the progressive output video heavily weights a corresponding line of each of the first field and the second field of the interlaced source video. Desirably, each line of the progressive output video also lightly weights an immediately successive and an immediately preceding line of each of the first field and the second field of the interlaced video source. This weighting preserves a high image quality even as the line count is halved.

It has been found that generating progressive output video from interlaced source video according to the invention provides for high-quality output images. Additionally, such generation is easily accomplished by the typical personal computer. Thus, the invention provides for high-quality output images, generatable by a personal computer.

$$x=2*(f1(x)+f2(x))+f1(x-1)+f2(x-1)+f1(x+1)+f2(x+1)$$

Desirably, each line of the progressive output video is weighted according to the formula, where x is the fine of the progressive output video, f1 is a line of the first field of the interlaced source video, and f2 is a line of the second field of the interlaced source video.

The present invention includes progressive output video, computerized methods, systems, computers, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, an overview of the invention is presented. In the third section, a computerized system and a computerized method in accordance with an embodiment of the invention is provided. Finally, in the fourth section, a conclusion of the detailed description is provided.

Hardware and Operating Environment

Figure 2:
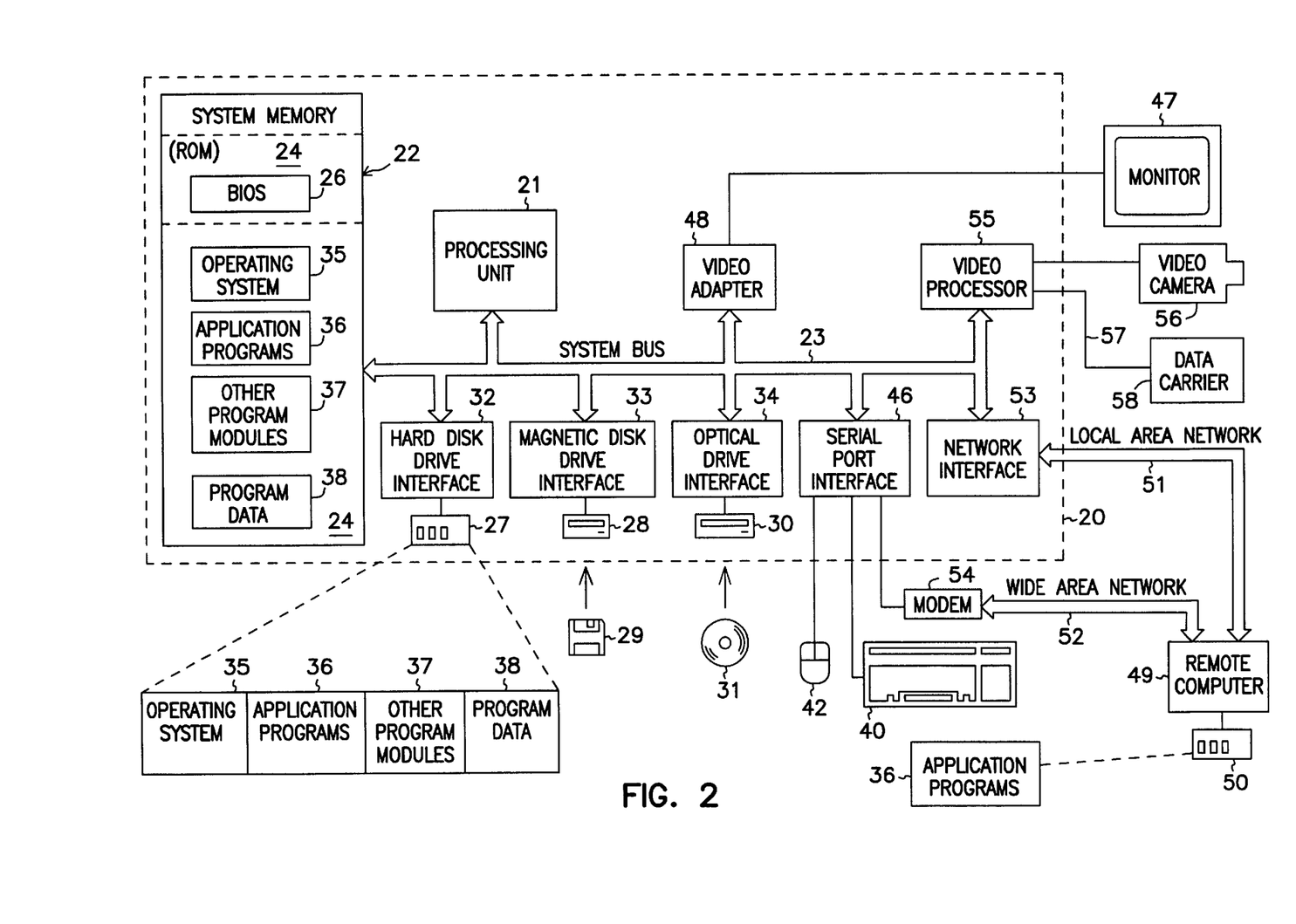
FIG. 2 shows a diagram of the hardware and operating environment in conjunction with which embodiments of the invention may be practiced.

Referring to FIG. 2, a diagram of the hardware and operating environment in conjunction with which embodiments of the invention may be practiced is shown. The description of FIG. 2 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 2 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 2. The logical connections depicted in FIG. 2 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Overview of the Invention

In this section of the detailed description, an overview of the invention, according to one embodiment of the invention, is provided. Those of ordinary skill within the art will appreciate, however, that the invention is not limited to this specific embodiment. The overview is presented in conjunction with FIG. 3.

Figure 3:
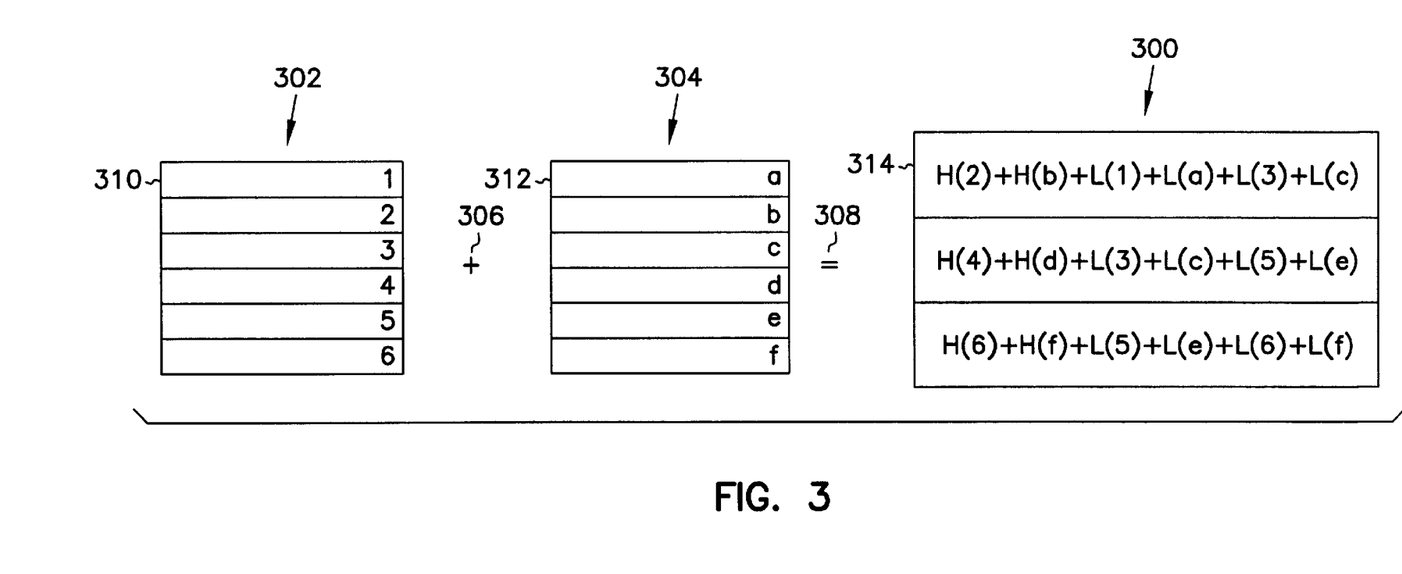
FIG. 3 shows a diagram of a manner by which interlaced source video may be converted to progressive output video according to an embodiment of the invention.

Referring now to FIG. 3, progressive output video image 300 is generated by weighting fields 302 and 304, which make up an interlaced source video image. Plus sign 306 indicates that fields 302 and 304 are weighted together in accordance with an embodiment of the invention, while equals sign 308 indicates that the resulting progressive output video image 300 is generated by such weighting together of fields 302 and 304 of the interlaced source video image. The invention is not particularly limited to a specific interlaced source video image; in one embodiment, such interlaced source video is a television signal. Field 302 includes a number of scan lines, such as scan line 310, numbered one through six, that correspond to the odd scan lines of the interlaced source video image. Field 304 also includes a number of scan lines, such as scan line 312, numbered a through f, that correspond to the even scan lines of the interlaced source video image. Because each of fields 302 and 304 has six scan lines, there are a total of twelve scan lines within the interlaced source video image.

The single field of progressive output video image 300 includes only three scan lines (such as scan line 314), however, or a number of scan lines half that within the interlaced source video image. Each of the scan lines of image 300 heavily weights a corresponding scan line of each of fields 302 and 304. Desirably, each of the scan lines of image 300 also lightly weights the preceding and successive scan lines of the corresponding scan line of each of fields 302 and 304 as well. Thus, the second scan line of image 300, as shown in FIG. 3, heavily weights the scan line of field 302 labeled four, and the scan line of field 304 labeled d. Desirably, the second scan line of image 300 also lightly weights the scan lines of field 302 labeled three and five (the preceding and successive scan lines to the line labeled four), and the scan lines of field 304 labeled c and e (the preceding and successive scan lines to the line labeled d).

In the embodiment of the invention where scan lines from fields 302 and 304 are also lightly weighted to produce image 300 as well as heavily weighted, certain boundary conditions apply. That is, with respect to the line of field 302 labeled six and the line of field 304 labeled f, there is no "successive scan line," since the line labeled six and the line labeled f are the last scan lines in their appropriate fields. In such a situation, the embodiment of the invention substitutes the last such scan lines for the "successive scan lines" where necessary, since there are no successive scan lines.

In one embodiment of the invention, a given scan line 314 within progressive $$x=2*(f1(x)+f2(x))+f1(x-1)+f2(x-1)+f1(x+1)+f2(x+1)$$

output video 300 is weighted according to the formula, where x is the line of the progress output video, f1 is a line of field 302 of the interlaced source video, and f2 is a line of field 304 of the interlaced source video. In this embodiment, the boundary conditions may be represented as: f1(y<first line number for field 302)=first line number for field 302, f1(y>last line number for field 302)=last line number for field 302, f2(y<first line number for field 304)= first line number for field 304, and f2(y>last line number for field 304)=last line number for field 304.

Generation of progressive output video in accordance with the invention has been found to greatly improve the image quality of such progressive video, as compared to the prior art. Moreover, such generation may be accomplished on a personal computer such as that which has been described and shown in conjunction with FIG. 2. In particular, in the embodiment of the invention in which the scan lines of the output video image are calculated according to the formula described above, the embodiment can be implemented using divisors that are themselves divisible by two, such that the formula can be evaluated using two's complement math. Thus, a real-time implementation of this embodiment of the invention is practical on typical desktop personal computers.

System and Method According to an Exemplary Embodiment

Figure 4:
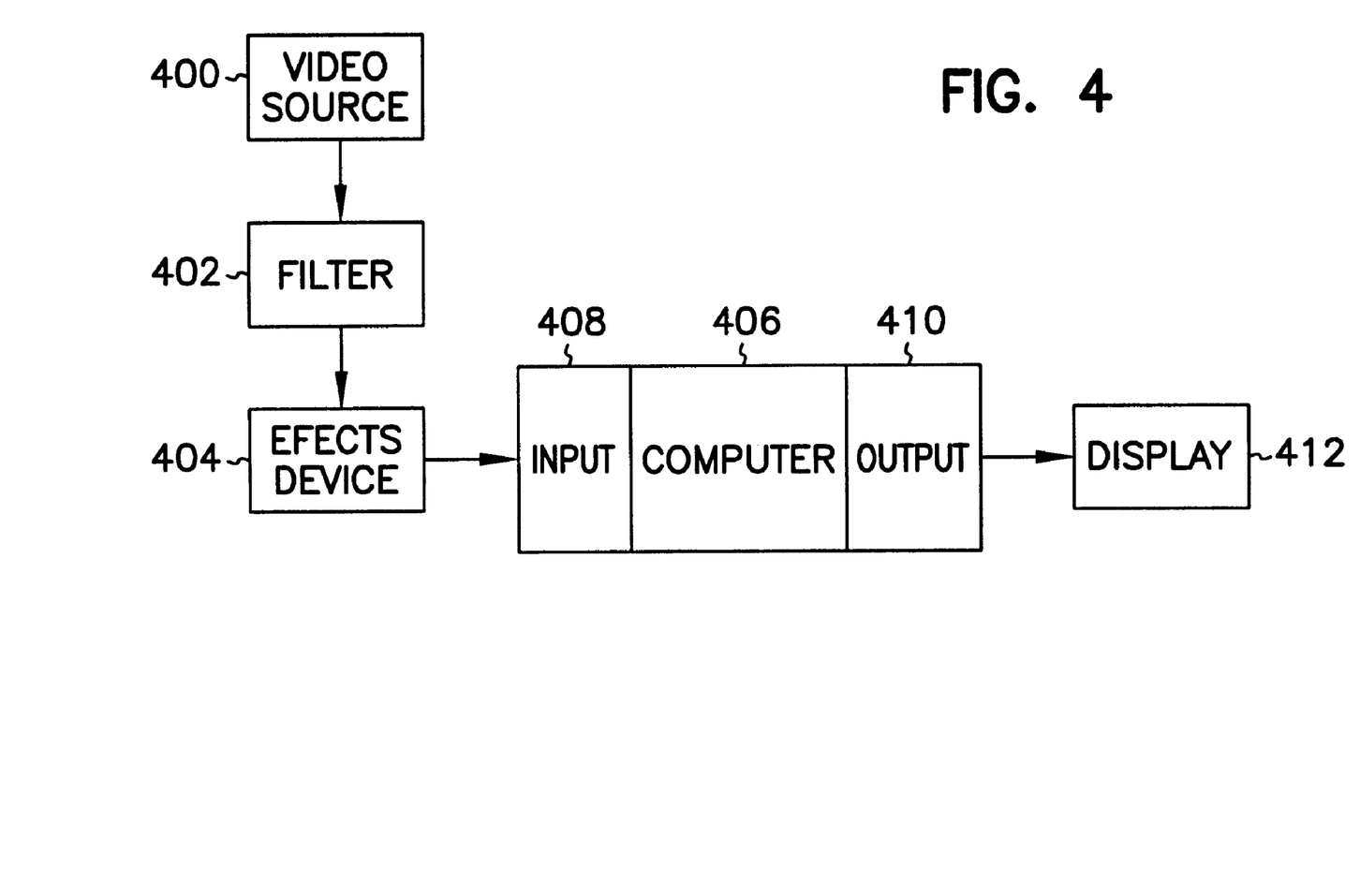
FIG. 4 shows a diagram of a computerized system in accordance with an embodiment of the invention; and, FIG. 5 shows a flowchart of a computerized method in accordance with an embodiment of the invention.
Figure 5:
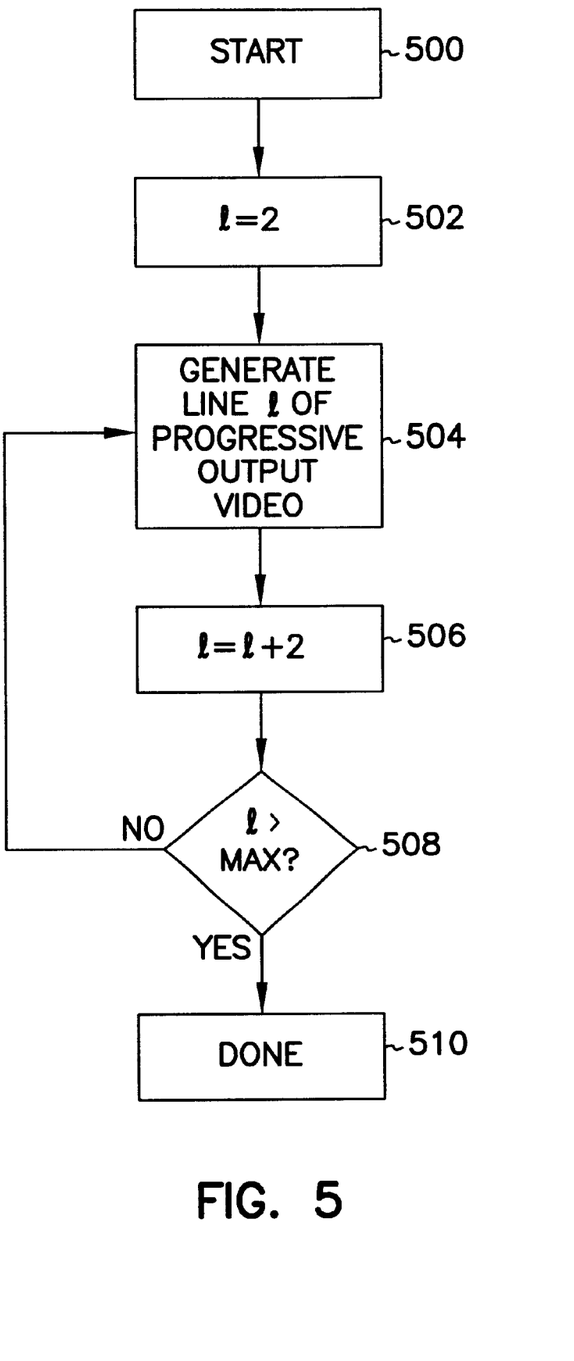

In this section of the detailed description, a computerized system and method according to an exemplary embodiment of the invention is described, by reference to FIGS. 4 and 5. Referring first to FIG. 4, a diagram of a computerized system in accordance with an embodiment of the invention is shown. Video source 400 provides an interlaced source video that has a number of scan lines. The source video, as has been described, includes a first field having the odd scan lines and a second field having the even scan lines. The invention is not particularly limited to a given video source 400. Common video sources include tape decks, television tuners, etc. Those of ordinary skill within the art will recognize that this description relates to a first field having the odd scan lines and a second field having the even scan lines for illustrative purposes only; the invention is not so limited. That is, depending on the format used for the source video—such as NTSC in North America, and PAL in Europe—either the first or the second field may have the odd scan lines, and the other field may have the even scan lines.

Video source 400 is desirably connected to filter 402. Filter 402 removes horizontal energy. For the common case of qSIF (160×112) output images size, energy above 1.5 MHZ that may be present in the interlaced source video is removed. In one embodiment of the invention, filter 402 is a Digital Vision-brand DVNR 1000 brick wall filter, known within the art. Filter 402 is desirably connected to effects device 404. Effects device 404 reduces horizontally the size of the interlaced source video by a factor of four; the vertical size of the interlaced source video is left unchanged. In one embodiment, device 404 is a SciTeck A57 frame store effects device, known within the art, with the Nyquist filter capability of this device turned off.

The resulting tall and skinny interlaced source video image is routed from effects device 404 to input 408 of computer 406. Computer 406 acts as the video processor of the computerized system, generating a progressive output video image having a number of lines half that of the number of lines of the interlaced source video image. The progressive output video image is generated in accordance with the overview of the invention as has been described.

In one embodiment, a computer program is run on computer 406 to generate the progressive output video. The invention is not specifically limited to a video processor that is a computer, however; furthermore, in one embodiment, the video processor is a computer as has been described in conjunction with FIG. 2. Additionally, input 408 may be a graphics card inserted into computer 406, such as a True-Vision Targa 2000 Pro graphics card, known within the art, and programmed to capture the entire height of the narrow skinny interlaced source video image.

After processing by computer 406, the resulting progressive output video image has the same width as the interlaced source video image reduced by four (as previously accomplished by device 404), and a height reduced by two (resulting from processing by computer 406 itself). This progressive output video image is passed through output 410 to display 412, on which the image may then be viewed. Output 410 may be the same graphics card as input 408, or another type of video output. Display 412 is desirably a computer monitor, as known within the art.

Referring next to FIG. 5, a flowchart of a computerized method according to one embodiment of the invention is shown. The method may be performed within the system just described (specifically, by the video processor of the system). The method is desirably a computer program stored on a computer-readable medium, such as a memory (random-access or read-only memory, for instance), a floppy disk, or a compact-disc read-only-memory (CD-ROM). The description in this section enables one of ordinary skill within the art to construct a computer program encompassing such a computerized method.

Referring now to FIG. 5, from the start in step 500, control proceeds to step 502, where the variable l is set to 2. Next, in step 504, scan line l of the progressive output video image $$x=2*(f1(x)+f2(x))+f1(x-1)+f2(x-1)+f1(x+1)+f2(x+1)$$

is weighted according to the formula,
where x is the line of the progressive output video, f1 is a line of the first field of the interlaced source video, and f2 is a line of the second field of the interlaced source video. Desirably, certain boundary conditions apply: f1(y<first line number for the first field)=first line number for the first field, f1(y>last line number for the first field)=last line number for the first field, f2(y<first line number for the second field)= first line number for the second field, and f2(y>last line number for the second field)=last line number for the second field.

In step 506, the variable l is incremented by two. In step 508, it is determined whether the variable l exceeds the maximum number of lines in the progressive output video. If the last line number of the output video has not yet been calculated, then the method returns back to step 504. However, if the last line number has already been calculated, then the method proceeds to step 510, where it ends.

CONCLUSION

Generation of a progressive output video from an interlaced source video has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized system comprising:
   an interlaced source video having a number of lines and comprising a first field including odd lines and a second field including even lines; and,
   a progressive output video having a number of lines half that of the number of lines of the interlaced source video, each line heavily weighting a corresponding line of each of the first field and the second field of the interlaced source video and lightly weighting an immediately successive line and an immediately preceding line of the corresponding line of each of the first field and the second field of the interlaced video source.

2. The computerized system of claim 1, wherein each line of the progressive output video lightly weights the immediately successive line and the immediately preceding line by one-half.

3. The computerized system of claim 2, wherein each line of the progressive output $$x=2*(f1(x)+f2(x)+f1(x-1)+f2(x-1)+f1(x+1)+f2(x+1)/8$$

video is weighted according to the formula,
where x is the line of the progress output video, f1 is a line of the first field of the interlaced source video, and f2 is a line of the second field of the interlaced source video.

4. The computerized system of claim 3, wherein f1(y<first line number for the first field)=first line number for the first field, f1(y>last line number for the first field)=last line number for the first field, f2(y<first line number for the first field)=first line number for the first field, and f2(y>last line number for the second field)=last line number for the second field.

5. A computerized system comprising:
   a source of an interlaced source video having a nunber of lines and comprising a first field including even lines and a second field including odd lines; and,
   a video processor to generate a progressive output video having a number of lines half that of the number of lines of the interlaced source video, each line heavily weighting a corresponding line of each of the first field and the second field of the interlaced source video and lightly weighting an immediately successive line and an immediately preceding line of the corresponding line of each of the first field and the second field of the interlaced video source.

6. The computerized system of claim 5, further comprising:
   a filter to remove horizontal energy from the interlaced video above 1.5 MHZ; and,
   an effects device to reduce horizontally the size of the interlaced video by a factor of four.

7. The computerized system of claim 5, further comprising: a display device on which the progressive output video is displayed.

8. The computerized system of claim 5, wherein the video processor comprises a computer running a computer program to generate the progressive output video.

9. The computerized system of claim 5, wherein each line of the progressive output video further weights by one-half the immediately successive line and the immediately preceding line of the corresponding line of each of the first field and the second field of the interlaced video source.

10. The computerized system of claim 9, wherein each line of the progressive output $$x=2*(f1(x)+f2(x))+f1(x-1)+f2(x-1)+f1(x+1)+f2(x+1)$$

video is weighted according to the formula, where x is the line of the progressive output video, f1 is a line of the first field of the interlaced source video, and f2 is a line of the second field of the interlaced source video.

11. A progressive output video having a number of lines and based on an interlaced source video having a number of lines and comprising: a first field including odd lines and a second field including even lines, each line of the progressive output video weighted according $$x=2*(f1(x)+f2(x))+f1(x-1)+f2(x-1)+f1(x+1)+f2(x+1)$$

to the formula, where x is the line of the progress output video, f1 is a line of the first field of the interlaced source video, and f2 is a line of the second field of the interlaced source video.

12. The progressive output video of claim 11, wherein f1(y<first line number for the first field)=first line number for the first field, f1(y>last line number for the first field)=last line number for the first field, f2(y<first line number for the first field)=first line number for the first field, and f2(y>last line number for the second field)=last line number for the second field.

13. A computer comprising:
   a video input receiving an interlaced source video having a number of lines and comprising a first field including even lines and a second field including odd lines;
   a video output providing a progressive output video having a number of lines half that of the number of lines of the interlaced source video, each line heavily weighting a corresponding line of each of the first field and the second field of the interlaced source video and lightly weighting an immediately successive line and an immediately preceding line of the corresponding line of each of the first field and the second field of the interlaced video source;
   a processor;
   a computer-readable medium; and,
   a computer program executed by the processor from the medium to generate the progressive output video from the interlaced source video.

14. The computer of claim 13, wherein the computer-readable medium comprises a memory.

15. The computer of claim 13, wherein each line of the progressive output video further lightly weights the immediately successive line and the immediately preceding line by one-half.

16. The computer of claim 15, wherein each line of the progressive output video is $$x=2*(f1(x)+f2(x))+f1(x-1)+f2(x-1)+f1(x+1)+f2(x+1)$$

weighted according to the formula, where x is the line of the progress output video, f1 is a line of the first field of the interlaced source video, and f2 is a line of the second field of the interlaced source video.

17. A computerized method comprising:
   receiving an interlaced source video having a number of lines; and,
   generating each of a number of lines of a progressive output video according to the $$x=2*(f1(x)+f2(x))+f1(x-1)+f2(x-1)+f1(x+1)+f2(x+1)$$

formula, where x is the line of the progress output video, f1 is a line of the first field of the interlaced source video, and f2 is a line of the second field of the interlaced source video.

18. The computerized method of claim 17, wherein f1(y<first line number for the first field)=first line number for the first field, f1(y>last line number for the first field)=last line number for the first field, f2(y<first line number for the first field)=first line number for the first field, and f2(y>last line number for the second field)=last line number for the second field.

19. A computer-readable medium having a program stored thereon for execution on a suitably equipped computer, the program comprising:
   means for receiving an interlaced source video having a number of lines; and,
   means for generating each of a number of lines of a progressive output video according to the formula, $$x=2*(f1(x)+f2(x))+f1(x-1)+f2(x-1)+f1(x+1)+f2(x+1)$$

where x is the line of the progress output video, f1 is a line of the first field of the interlaced source video, and f2 is a line of the second field of the interlaced source video.

20. The computer-readable medium of claim 19, wherein f1(y<first line number for the first field)=first line number for the first field, f1(y>last line number for the first field)=last line number for the first field, f2(y<first line number for the first field)=first line number for the first field, and f2(y>last line number for the second field)=last line number for the second field.

21. A computer implemented method of converting video, the method comprising:
   receiving an interlaced source video having a number of lines and comprising a first field including odd lines and a second field including even lines; and,
   heavily weighting a corresponding line of each of the first field and the second field of the interlaced source video; and
   lightly weighting an immediately successive line and an immediately preceding line of the corresponding line of each of the first field and the second field of the interlaced video source to provide a progressive output video having a number of lines half that of the number of lines of the interlaced source video.

22. A computer implemented method of converting video, the method comprising:

receiving an interlaced source video having a number of lines and comprising a first field including odd lines and a second field including even lines; and, heavily weighting a corresponding line of each of the first field and the second field of the interlaced source video; and lightly weighting an adjacent line of the first field and the second field of the interlaced video source; and combining the heavily weighted lines with the lightly weighted line to provide a progressive output video having a number of lines half that of the number of lines of the interlaced source video.

23. A computer implemented method of converting video, the method comprising:

receiving an interlaced source video having a number of lines and comprising a first field including odd lines and a second field including even lines; and, heavily weighting a corresponding line of each of the first field and the second field of the interlaced source video;

lightly weighting an immediately successive line and an immediately preceding line of the corresponding line of each of the first field and the second field of the interlaced video source; and combining the heavily weighted lines with the lightly weighted lines to provide a progressive output video having a number of lines half that of the number of lines of the interlaced source video.

24. A computer readable medium having instructions for causing a computer to implement a method of converting video, the method comprising:

receiving an interlaced source video having a number of lines and comprising a first field including odd lines and a second field including even lines; and, heavily weighting a corresponding line of each of the first field and the second field of the interlaced source video; and lightly weighting an adjacent line of the first field and the second field of the interlaced video source; and combining the heavily weighted lines with the lightly weighted line to provide a progressive output video having a number of lines half that of the number of lines of the interlaced source video.

25. A computer readable medium having instructions for causing a computer to implement a method of converting video, the method comprising:

receiving an interlaced source video having a number of lines and comprising a first field including odd lines and a second field including even lines; and, heavily weighting a corresponding line of each of the first field and the second field of the interlaced source video;

lightly weighting an immediately successive line and an immediately preceding line of the corresponding line of each of the first field and the second field of the interlaced video source; and combining the heavily weighted lines with the lightly weighted lines to provide a progressive output video having a number of lines half that of the number of lines of the interlaced source video.

* * * * *

UNITED STATES PATENT AND TRADEMARK OFFICE
CERTIFICATE OF CORRECTION

PATENT NO. : 6,256,069 B1  Page 1 of 1
DATED : July 3, 2001
INVENTOR(S) : Andrew D. Rosen; William J. Heaton; John A. Painter; Phillip G. Zack It is certified that error appears in the above-identified patent and that said Letters Patent is hereby corrected as shown below:

<u>Title page,</u>
ABSTRACT, after "first field" change "haveing" to -- having --

<u>Column 2,</u>
Line 57, change "fine" to -- line --

<u>Column 8,</u>
Line 62, change "nunber" to -- number --

Signed and Sealed this

Twenty-sixth Day of March, 2002

Attest:

JAMES E. ROGAN
*Attesting Officer*   *Director of the United States Patent and Trademark Office*